US011222380B2

(12) United States Patent
Koch et al.

(10) Patent No.: US 11,222,380 B2
(45) Date of Patent: Jan. 11, 2022

(54) METHOD, DEVICE, AND COMPUTER-READABLE STORAGE MEDIUM FOR FORECASTING EXPENDITURES TO IMPROVE CUSTOMER SHOPPING EXPERIENCE IN A STORE ENVIRONMENT

(71) Applicant: AT&T Intellectual Property I, L.P., Atlanta, GA (US)

(72) Inventors: Robert Alan Koch, Norcross, GA (US); Ari Craine, Mariette, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 53 days.

(21) Appl. No.: 16/438,634

(22) Filed: Jun. 12, 2019

(65) Prior Publication Data
US 2020/0394700 A1  Dec. 17, 2020

(51) Int. Cl.
*G06Q 30/00* (2012.01)
*G06Q 30/06* (2012.01)
*G06Q 40/00* (2012.01)

(52) U.S. Cl.
CPC ..... *G06Q 30/0633* (2013.01); *G06Q 30/0641* (2013.01); *G06Q 40/12* (2013.12)

(58) Field of Classification Search
CPC ................ G06Q 30/0601–0645; G06Q 40/12
USPC .................................................. 705/26.1–30
See application file for complete search history.

(56) References Cited

U.S. PATENT DOCUMENTS

| 7,637,426 | B1 * | 12/2009 | Green | G06Q 30/06 |
| | | | | 235/383 |
| 8,341,022 | B2 | 12/2012 | Edwards | |
| 8,370,207 | B2 | 2/2013 | Edwards | |
| 9,336,508 | B2 | 5/2016 | Soon-Shiong | |
| 9,400,993 | B2 | 7/2016 | Edwards | |
| 9,940,589 | B2 | 4/2018 | Edwards | |
| 9,953,288 | B2 | 4/2018 | Soon-Shiong | |
| 10,074,129 | B2 | 9/2018 | Edwards | |
| 10,553,032 | B2 * | 2/2020 | Ericson | G06T 11/00 |

(Continued)

OTHER PUBLICATIONS

ABI Research "A Mixed Reception for Augmented Reality in Bricks & Mortar Retail: Efficiencies over Engagement" (2018) PR News Wire. (Year: 2018).*

(Continued)

*Primary Examiner* — Allison G Wood
*Assistant Examiner* — Katherine A Barlow
(74) *Attorney, Agent, or Firm* — Hartman & Citrin LLC

(57) ABSTRACT

Concepts and technologies disclosed herein are directed to forecasting expenditures to improve customer shopping experience in a store environment. According to one aspect disclosed herein, a device associated with a customer can present a shopping cart user interface and initiate a forecast spend module of a forecast spend application. The device can monitor an item detection module of the forecast spend application for a new item added to a physical shopping cart associated with the shopping cart user interface or otherwise marked for purchase. In response to the new item being added to the shopping cart or otherwise marked for purchase, the device can update, via the forecast spend module, a forecast spend field in the shopping cart user interface with a forecast spend value based upon a cost of the new item.

12 Claims, 13 Drawing Sheets

(56) References Cited

U.S. PATENT DOCUMENTS

| | | | |
|---|---|---|---|
| 2004/0073489 A1* | 4/2004 | Varatharajah | B62B 3/1424 |
| | | | 705/23 |
| 2005/0177463 A1 | 8/2005 | Crutchfield, Jr. et al. | |
| 2013/0311334 A1* | 11/2013 | Crucs | G06Q 30/0631 |
| | | | 705/26.63 |
| 2014/0122310 A1* | 5/2014 | Torrens | G06Q 40/02 |
| | | | 705/35 |
| 2014/0172621 A1* | 6/2014 | Vittolia | G06Q 30/0631 |
| | | | 705/26.7 |
| 2014/0365336 A1 | 12/2014 | Hurewitz | |
| 2015/0294385 A1* | 10/2015 | Grigg | G06Q 30/0613 |
| | | | 705/26.41 |
| 2017/0116667 A1 | 4/2017 | High et al. | |
| 2017/0345079 A1* | 11/2017 | Rangan | G06Q 30/0633 |
| 2017/0358024 A1 | 12/2017 | Mattingly et al. | |
| 2018/0047093 A1 | 2/2018 | High et al. | |
| 2018/0136465 A1* | 5/2018 | Chi | G06F 3/0416 |
| 2018/0182025 A1* | 6/2018 | Smith | G06Q 30/0623 |

OTHER PUBLICATIONS

Allison, Conor. "Amazon retail stores could let you shop in augmented and virtual reality" (2017) Wareable.com (Year: 2017).*

Trevor Mogg, "This High-tech shopping cart has the same aim as Amazon Go," Digital Trends, https://www.digitaltrends.com/cooltech/this-high-tech-shopping-cart-has-the-same-aim-as-amazon-go/, Jan. 10, 2019.

* cited by examiner

METHOD, DEVICE, AND COMPUTER-READABLE STORAGE MEDIUM FOR FORECASTING EXPENDITURES TO IMPROVE CUSTOMER SHOPPING EXPERIENCE IN A STORE ENVIRONMENT

BACKGROUND

Mobile computing devices such as smartphones and tablet computers have become an integral part of many people's lives. Many people use these devices as an aid for researching, comparing and purchasing products online as well as in physical stores. In fact, some reports indicate that up to 84% of smartphone shoppers utilize their smartphones while in a physical store to, among other things, research product specifications, compare prices, and read reviews.

Some application developers have created device applications that leverage augmented reality techniques to further enhance user experiences. Augmented reality techniques utilize a camera to present a live view of a scene and augment the scene with additional information. For example, a navigation application that leverages augmented reality technology may present a live view of a street scene and augment the street scene with address information, directions, and/or other navigation information as an overlay to the live images captured by the camera. Other augmented reality applications exist, including some that allow shoppers to get additional information regarding products within a store.

SUMMARY

Concepts and technologies disclosed herein are directed to aspects of forecasting expenditures to improve customer shopping experience in a store environment. According to one aspect disclosed herein, a device associated with a customer can present a shopping cart user interface and initiate a forecast spend module of a forecast spend application. The device can monitor an item detection module of the forecast spend application for a new item added to a physical shopping cart associated with the shopping cart user interface or otherwise marked for purchase. In response to the new item being added to the shopping cart or otherwise marked for purchase, the device can update, via the forecast spend module, a forecast spend field in the shopping cart user interface with a forecast spend value based upon a cost of the new item.

In some embodiments, the device can check via a budget module of the forecast spend application, a predetermined budget for the customer. In response to the budget module finding the predetermined budget, the device can update a budget field in the shopping cart user interface with a budget value based upon at least part of the predetermined budget. In some embodiments, the device can calculate, via the budget module, an over/under budget value. In response to determining that the checkout has occurred, the device can update the forecast spend field, the budget field, and the over/under budget field in the shopping cart user interface.

In some embodiments, the device can present one or more forecast filters on the shopping cart user interface. The device can receive a selection of the forecast filter via the shopping cart user interface. In response to the selection, the device can enable, via the forecast spend module, the forecast filter, and can update the forecast spend field based upon the forecast filter. In some embodiments the forecast filter causes the forecast spend value to be updated to include: a cost of a shopping list item not yet in the shopping cart or otherwise marked for purchase; a cost of a cheaper item that is comparable to the new item; a cost of a same item that is cheaper at a remote store; a cost of a recommended item; a cost of the new item with an item bundle discount; a cost of the new item based upon an upcoming sale; a cost of a smart home inventory item based upon a smart home alert received by the user device; or a cost of the new item with a subscription discount.

In some embodiments, the device can include or can be in communication with an augmented reality display. The device can present the shopping cart user interface as an augmented reality object via the augmented reality display.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
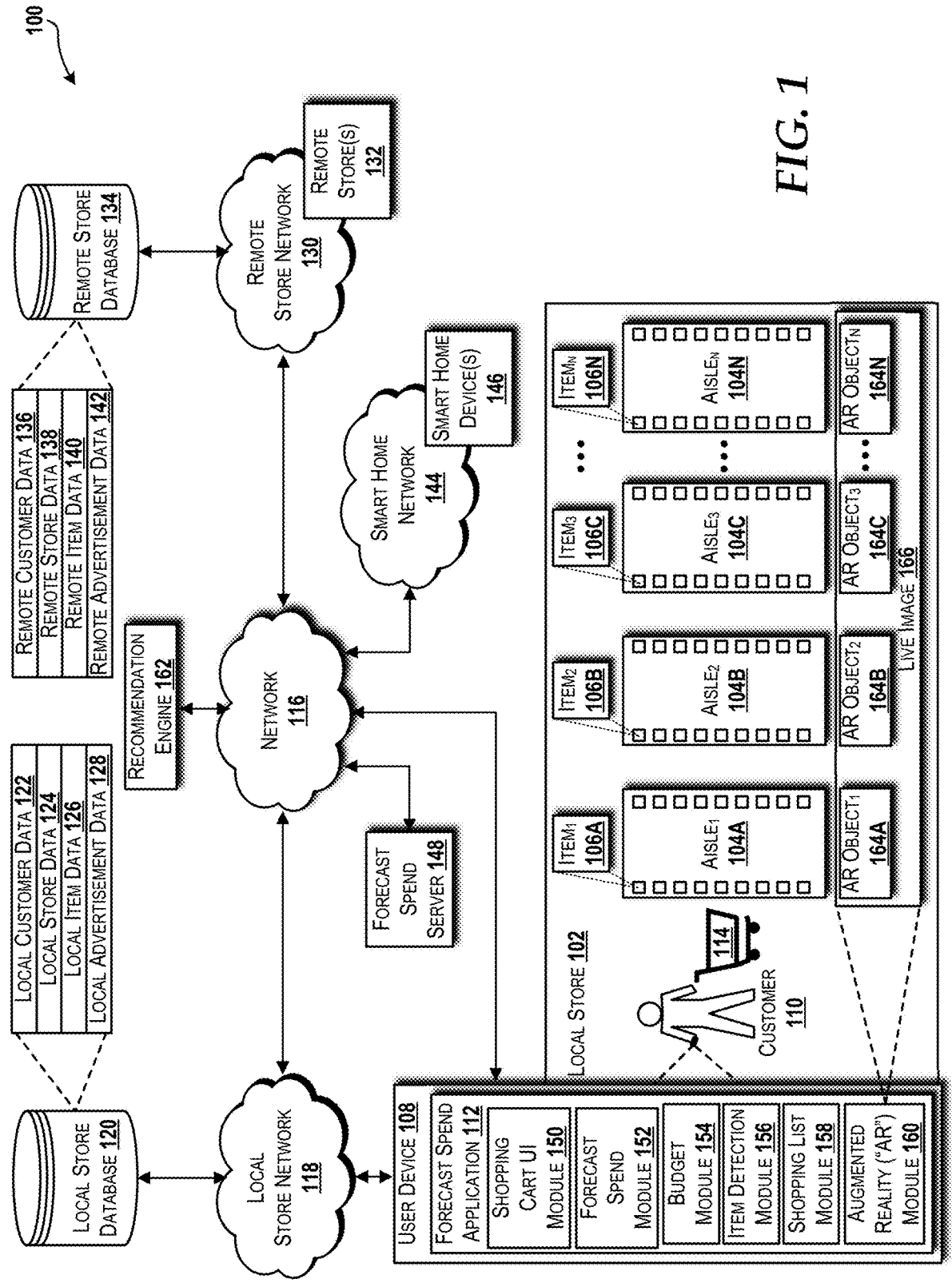
FIG. 1 is a block diagram illustrating aspects of illustrative operating environment for various concepts and technologies disclosed herein.

Referring now to FIG. 1, aspects of an operating environment 100 for various embodiments of the concepts and technologies disclosed herein will be described. The operating environment 100 shown in FIG. 1 includes a local store 102 that includes a plurality of aisles 104A-104N (hereinafter referred to individually as "an aisle 104," or collectively as "aisles 104") in which a plurality of items 106A-106N (hereinafter referred to individually as "item 106," or collectively as "items 106") can be located. A user device 108 is associated with a customer 110 who is engaged in a shopping experience within the local store 102 to ultimately purchase one or more of the items 106.

The user device 108 can execute, via one or more processors (best shown in FIG. 5), a forecast spend application 112 to perform various operations described herein, such as to track a cost of the item(s) 106 placed in a physical shopping cart 114 as the customer 110 browses the items 106 in the local store 102. In this manner, the forecast spend application 112 can maintain a forecast spend value indicative of the total cost of the item(s) 106 in the physical shopping cart 114 should the customer 110 decide to checkout with the physical shopping cart 114 in its current state. In some embodiments, the physical shopping cart 114 is replaced with a shopping basket, a shopping bag, or the like. In other embodiments, the customer 110 carries the item(s) 106 in hand. An individual other than the customer 110, a robot, or an animal (e.g., a service dog) might carry the item(s) 106 for the customer 110. Moreover, the forecast spend application 112 can consider other factors, such as a shopping list of items 106 not yet in the physical shopping cart 114, cheaper items comparable to the item(s) 106 in the physical shopping cart 114, the item(s) 106 cheaper elsewhere (e.g., another store—physical or online), recommendations, bundle discounts on some combination of the items 106, upcoming sales on the item(s) 106, smart home inventory needs, and subscription discounts, for example. The forecast spend application 112 can provide one or more forecast filter options to enable consideration of these and other factors. Example user interface diagrams showing an implementation of some exemplary forecast filters are described herein with reference to FIGS. 2A-2F. These and other aspects of the forecast spend application 112 will be described in greater detail herein below.

The local store 102 can be or can include any establishment that offers for sale at least one of the items 106. The aisles 104 in the local store 102 are illustrated to provide an example of a configuration to display the items 106 to the customer 110. In particular, each of the aisles 104 can include one or more shelves for displaying one or more of the items 106. It should be understood that other configurations to display the items 106 to the customer 110 are contemplated, and as such, the illustrated example should not be construed as being limiting in any way. By way of example, and not limitation, the local store 102 can be or can include a general purpose store, a specialty store, a big box store, a grocery store, a home improvement store, a department store, a restaurant, a coffee shop, an electronics store, a car dealership, an auto parts store, a franchise store, or the like. Moreover, the local store 102 is not limited to a traditional store environment. Some alternative store environments include, but are not limited to, outdoor environments, stadiums, tents and other temporary structures, houses and other residential environments, parking garages, commercial buildings, outdoor sales events, festivals, concerts, other non-retail environments, and the like.

The user device 108, in some embodiments, is a mobile device such as, for example, a smartphone, a tablet device, a personal digital assistant, a laptop computer, or the like. The user device 108, in some other embodiments, is a wearable device such as, for example, a smart watch, a pair of smart glasses, smart jewelry, a fitness accessory, or the like. In some other embodiments, the user device 108 is built-in to the physical shopping cart 114, a shopping basket, or the like, and can be associated with the customer 110 upon entry, at checkout, or via other mechanisms.

The user device 108, in some embodiments, is in communication with one or more secondary devices, which may be mobile devices, wearable devices (e.g., augmented reality glasses), implanted devices, and/or electronic tattoos. Communication between the user device 108 and the secondary device(s) can be facilitated by a short-range communications technologies such as, for example, BLUETOOTH, BLUETOOTH low energy ("BLE"), infrared, infrared data association ("IRDA"), near field communications ("NFC"), other RF technologies, or the like. Communication between the user device 108 and the secondary device(s) can be facilitated by WI-FI, other wireless technologies, or wired technologies.

The user device 108, in the illustrated example, is operating in communication with and/or as part of a communications network ("network") 116. The network 116 can include one or more wireless local area networks ("WLANs"), one or more wireless wide area networks ("WWANS"), one or more wireless metropolitan area networks ("WMANs"), one or more campus area networks ("CANs"), and/or one or more packet data networks (e.g., the Internet). The user device 108 can communicate with the network 116 using any wireless communications technology or combination of wireless communications technologies, some examples of which include, but are not limited to, WI-FI, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other Institute of Electrical and Electronics Engineers ("IEEE") 802.XX technologies, and the like. The user device 108 can communicate with the network 116 via various channel access methods (which may or may not be used by the aforementioned technologies), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like. Data can be exchanged between the user device 108 and the network 116 via cellular data technologies such as, but not limited to, General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. It should be understood that the network 116 may additionally include infrastructure that operates on wired communications technologies, including, but not limited to, optical fiber, coaxial cable, twisted pair cable, and the like to transfer data between various systems operating on or in communication with the network 116. Additional details regarding an illustrative example embodiment of the network 116 is illustrated and described with reference to FIG. 7.

The user device 108, in the illustrated example, is additionally operating in communication with and/or as part of a local store network 118. The local store network 118 can include one or more wireless LANs and may additionally include one or more wired LANs. In some embodiments, the local store network 118 includes one or more wireless access points (not shown) that operate in accordance with IEEE 802.11X specifications to provide the user device 108 with wireless connectivity to the local store network 118 through which the user device 108 can communicate with a local store database 120.

The illustrated local store database 120 is shown with local customer data 122, local store data 124, local item data 126, and local advertisement data 128. The local store database 120 can include other data associated with any aspect of the local store 102. It is contemplated that the local store database 120 can store other data that does not fall into one or more of the aforementioned data categories. As such, the inclusion of the aforementioned data categories in the local store database 120 should not be construed as being limiting in any way.

The local customer data 122 can include data associated with one or more customers such as the illustrated customer 110. For example, the local customer data 122 can include identity data such as name, birth date, gender, one or more physical addresses, one or more telephone numbers, one or more email addresses, social network information, customer account information including account identifiers and/or user identifiers, and/or job information. The local customer data 122 can additionally or alternatively include quantitative data, such as, for example, transactional information such as the number of items 106 purchased, details regarding the item purchases, value of item purchased, and item return history; communication information such as communication date, communication channel (e.g., telephone, email, chat, or social network) and communication subject; online activity such as website visits, item views, online registration information, and social network activity including posts, likes, and other social network interactions; and customer service information such as customer complaint details and customer inquiry details. The local customer data 122 can additionally or alternatively include descriptive data, such as, for example, marital status, number of children, age of children, property type, car type, number of car doors, number and type of pets, annual income, profession, education level, and the like. The local customer data 122 can additionally or alternatively include qualitative data, such as, for example, attitudinal information regarding how customers rate customer service, the value of item(s) 106 purchased, and the likelihood of purchasing the item(s) 106 again; opinion information regarding customer's favorite colors, favorite vacation locations, and other personal opinions; and emotional information regarding why the item(s) 106 was purchased (e.g., personal use, business use or as a gift), one or more reasons for purchasing a product (e.g., locality, brand, price, and/or quality), and the like. The local customer data 122 also can include permission and suppression preferences. It should be understood that the customer data 122 can include any combination of the aforementioned data and other data associated with customer that is not specified herein.

The local store data 124 can include data associated with various aspects of the local store 102. For example, the local store data 124 can include dimensions of the local store 102, a layout of the local store 102, and the location of each of the aisles 104 and/or other areas (e.g., departments, restrooms, customer service, cashiers, and the like) within the local store 102. It should be understood that the local store data 124 can include any combination of the aforementioned data and other data associated with the local store 102 that is not specified herein.

The local item data 126 can include data associated with one or more of the items 106 available for purchase within the local store 102. The local item data 126 can include, for example, category, title, description, image, uniform resource locator ("URL") for corresponding web page on a website associated with the local store 102, stock keeping unit ("SKU"), universal product code ("UPC"), shelf-life, wholesale price, retail price, sales price, historical price/price trend(s), location within the local store 102, quantity-on-hand, quantity-on-order, and backorder status. It should be understood that the local item data 126 can include any combination of the aforementioned data and other data associated with the items 106 that is not specified herein.

The local advertisement data 128 can include data associated with one or more advertisements about one or more of the items 106. The advertisement data 128 can include identifiers that map to one or more of the items 106 for which data is stored as part of the local item data 126 and for which one or more advertisements are available. The local advertisement data 128 can additionally include advertisement category, advertisement title, advertisement graphics, advertisement audio, advertisement video, advertisement description, advertisement price, advertisement restrictions, advertisement start date, and/or advertisement expiration date. It should be understood that the local advertisement data 128 can include any combination of the aforementioned data and other data associated with one or more advertisements for one or more of the items 106.

The network 116 can facilitate communications between the local store network 118 and one or more remote store networks 130 associated with one or more remote stores 132. The remote store networks 130 can be configured the same as or similar to the local store network 118. The remote stores 132 can be or can include one or more stores the same as, similar to, or completely different from the local store 102. The remote store(s) 132 can include physical store(s) (i.e., brick and mortar) and/or Internet-based store(s). The remote store network 130 is shown in communication with a remote store database 134 that is shown with remote customer data 136, remote store data 138, remote item data 140, and remote advertisement data 142, which can include data such as described above with respect to the local customer data 122, the local store data 124, the local item data 126, and the local advertisement data 128, respectively, but for the remote store(s) 132. The remote store database 134 can store other data associated with any aspect of the remote store(s) 132.

The network 116 also can facilitate communications with one or more smart home networks 144. The smart home network(s) 144 can enable local communications among smart home devices 146, such as, for example, via Wi-Fi and/or other communications technologies described herein. The smart home network(s) 144 also provides the smart home devices 146 with access to remote devices, such as the user device 108, via connectivity to the network 116. The smart home devices 146 can include any Internet of Things ("IoT") device, some examples of which include smart devices such as smart thermostats, smart alarm systems, smart appliances, smart speakers, smart televisions, and the like. In some embodiments, one or more of the smart home devices 146 can communicate with the user device 108 to notify the forecast spend application 112 of one or more of the items 106 needed. For example, a smart refrigerator may track inventory of one or more of the items 106, and may notify the forecast spend application 112 when replacement(s) is/are needed.

The network 116 also can facilitate communications between the user device 108, executing the forecast spend application 112, and a forecast spend server 148. In some embodiments, the forecast spend application 112 operates as a client application for the forecast spend server 148 that can execute a server application (not shown). The illustrated forecast spend application 112 can be executed by one or more processors (best shown in FIG. 5) of the user device 108 to perform operations described herein, such as the operations described herein below with reference to FIGS. 3 and 4. The illustrated forecast spend application 112 includes a shopping cart user interface ("UI") module 150, a forecast spend module 152, a budget module 154, an item detection module 156, a shopping list module 158, and an augmented reality module 160. Each of these modules 150, 152, 154, 156, 158, 160 can include instructions that are executable by the processor(s) of the user device 108 to perform specific operations described herein. The modules 150, 152, 154, 156, 158, 160 can be combined in a single application, such as the forecast spend application 112 in the illustrated embodiment. Alternatively, the modules 150, 152, 154, 156, 158, 160 can be implemented as one or more stand-alone applications, one or more application programming interfaces ("APIs"), and/or other configurations. For example, the forecast spend application 112 or any of the modules 150, 152, 154, 156, 158, 160 can be a thin client that communicates with the forecast spend server 148 via the network 116, and the forecast spend server 148 can perform remote processing for the thin client. Those skilled in the art will appreciate the numerous software configurations that can be implemented to provide the features of the modules 150, 152, 154, 156, 158, 160, and as such, the illustrated example and other examples disclosed herein should not be construed as being limiting in any way.

The shopping cart UI module 150 provides a shopping cart UI 200 (shown in FIGS. 2A-2F) through which the customer 110 can view his/her current shopping cart status, which can include, for example, details about the item(s) 106 associated with the physical shopping cart 114 or representative of the item(s) 106 otherwise marked for purchase by the customer 110. For example, the current shopping cart status can include an item quantity field 202, an item total field 204, a forecast spend field 206, a budget value field 208, and an over/under budget field 210, in addition to one or more forecast filters 212A-H (hereinafter referred to individually as "a forecast filter 212," or collectively as "forecast filters 212") to filter a value in the forecast spend field 206 (all best shown in FIGS. 2A-2F). While the illustrated embodiment shows a physical shopping cart 114, the customer 110 may mark the item(s) 106 for purchase by digitally adding item identifiers, such as contained in the local item data 126, to the shopping cart application UI 200. In this manner, the customer 110 might pick up the item(s) 106 during checkout or at some other time during his/her shopping experience. Additional details about the shopping cart UI module 150 will be described in further details below with reference to FIGS. 2A-2F.

The forecast spend module 152 calculates a forecast spend value as the item(s) 106 are marked for purchase, either by the customer 110 placing the item(s) in the physical shopping cart 114, a shopping basket, or the like, or by the customer 110 otherwise marking the item(s) 106 for purchase. In addition, the forecast spend module 152 provides the forecast filters 212 (best shown in FIGS. 2A-2F) to filter a value in the forecast spend field 206. For example, the forecast filters 212 can be enabled by the customer 110 to calculate the value in the forecast spend field 206 in consideration of a shopping list of items 106 not yet in the physical shopping cart 114, cheaper items comparable to the item(s) 106 in the physical shopping cart 114, the item(s) 106 cheaper elsewhere (e.g., another store—physical or online), recommendations, bundle discounts on some combination of the items 106, upcoming sales on the item(s) 106, smart home inventory needs, and subscription discounts, for example.

The budget module 154 provides budgeting features to the customer 110. For example, the budget module 154 may allow the customer 110 to create one or more budgets, edit one or more budgets, and save one or more budgets. The budget module 154 can be used to track spending by the customer 110 against one or more budgets and provide a budget value in the budget value field 208 and an over/under budget value in the over/under budget field 210. In some embodiments, the budget module 154 can interact with one or more financial institutions (e.g., bank, credit union, credit card company, and the like) to obtain financial information (e.g., available funds, available credit, and the like) associated with one or more financial accounts (e.g., checking, savings, credit card, loan, and the like) associated with the customer 110. In some embodiments, the budget module 154 can include an existing budgeting software, such as YNAB and MINT.

The item detection module 156 allows the forecast spend application 112 to detect when the items 106 are placed into the physical shopping cart 114. The detection mechanism used by the item detection module 156 can be based upon one or more sensors, scanning devices, cameras, combinations thereof, or the like positioned on, in, or otherwise associated with the shopping cart 114, a shopping basket, or the like. In some embodiments, a UPC is scanned by the physical shopping cart 114 when the item 106 is placed in or near the physical shopping cart 114, and this can prompt the physical shopping cart 114 to communicate with the user device 108 via BLUETOOTH, another short range communication technology, and/or via the local store network 118. Other identifying mechanisms such as radio frequency identity ("RFID") tags and the like also are contemplated. In some implementations, the physical shopping cart 114 is either not used or does not have at least some of the functionality described above. In these implementations, the item detection module 156 can utilize a sensor, a camera, a scanning component, or the like that is part of the user device 108 (see FIG. 5 and the description thereof for some example sensor and camera components). External devices, such as scanners located within the local store 102, such as in one or more of the aisles 104, also are contemplated. The item detection module 156 can be implemented in other ways not specifically described herein. The item detection module 156 fundamentally provides a way to track when the item 106 is marked for purchase by the customer 110. In this manner, a manual indication input by the customer 110 is one simplified method by which the item detection module 156 can perform this functionality.

The shopping list module 158 provides functionality for the customer 110 to create, edit, and delete one or more shopping lists. The shopping list(s) can be manually created, edited, and deleted by the customer 110. Alternatively or additionally, the shopping list(s) can be at least partially auto-populated based upon shopping list data obtained from a network, system, device, or service external to the user device 108. For example, the shopping list data may be obtained via the local store network 118 from the local store database 120 based upon the local customer data 122, the local store data 124, the local item data 126, the local advertisement data 128, portions thereof, combinations thereof, and the like. Other external sources can include the smart home device(s) 146, a recommendation engine 162 used to recommend one or more of the item(s) 106 to the customer 110, and the remote store database 134. The shopping list(s) can be associated only with the customer 110 or the customer 110 and one or more other individuals, such as a spouse, child, business partner, or friend of the customer 110. The shopping list module 158 can be implemented, at least in part, via any number of shopping list applications, notes applications, word processing applications, spreadsheet applications, or the like.

The augmented reality module 160 provides augmented reality functionality for the user device 108. In some embodiments, the customer 110 can use the user device 108 to observe one or more augmented reality ("AR") objects 164A-164N (hereinafter referred to individually as "AR object 164," or collectively as "AR objects 164") presented as an overlay on a live image 166 captured by a camera component (best shown in FIG. 5) of the user device 108 and presented via a display associated with the user device 108. The display (also best shown in FIG. 5) can be part of the user device 108, in communication with the user device 108, or part of a different device. In some embodiments, the different device can be a wearable device such as AR glasses.

The user device 108 can capture the live image 166 via a camera component configured to capture video and, in some implementations, still images. The camera component may utilize a charge coupled device ("CCD") or a complementary metal oxide semiconductor ("CMOS") image sensor to capture images, although other image capturing technologies are contemplated. In some embodiments, the camera component includes a flash and/or other accessory components to enhance the capabilities of the image sensor.

The display of the user device 108 can present the live image 166 with the AR objects 164 as an AR overlay. AR is a technology that uses digital images to augment real images perceived by a user. The AR object 164 can take any visual form. The AR objects 164 may use images, words, symbols, or any combination thereof to represent various aspects of the concepts and technologies disclosed herein. For example, the AR objects 164 can include any of the local/remote customer data 122/136, the local/remote store data 124/138, the local/remote item data 126/140, the local/remote advertisement data 128/142, data associated with the smart home devices 146, the shopping cart UI 200, and any other information associated with the forecast spend application 112.

In some embodiments, the AR objects 164 might be accompanied by an audio and/or a visual alert. Alternately, the audio and/or visual alert can be used instead of the AR object 164. The display can use part of an existing display component of the user device 108. Alternatively, the display can be part of another device or system (e.g., AR glasses), and can be embodied in various forms. In some embodiments, the display is a digital display with or without touchscreen capabilities. In some other embodiments, the display is integrated into at least a portion of a windshield of a vehicle. In some other embodiments, the display is a head-up display that is projected onto a windshield or another display canvas, such as piece of clear glass or clear plastic. The display technology used, resolution, dimensions, and other specifications of the display can be selected based upon the particular application. As such, the embodiments disclosed herein and described with reference to any particular display technology, resolution, dimension, and/or other specification should not be construed as being limiting in any way.

According to various embodiments, the functionality of the forecast spend server and the recommendation engine 162 may be provided by one or more server computers, desktop computers, mobile devices, laptop computers, set-top boxes, other computing systems, cloud computing systems, and the like. It should be understood that the functionality of the forecast spend server 148 and the recommendation engine 162 can be provided by a single device, by two similar devices, and/or by two or more dissimilar devices. For purposes of describing the concepts and technologies disclosed herein, the forecast spend server 148 and the recommendation engine 162 are described herein as a single computer system. It should be understood that this embodiment is illustrative, and should not be construed as being limiting in any way.

The recommendation engine 162 can recommend to customer 110 to purchase one or more of the items 106 based upon any available data, such as described above in the local store database 120 and the remote store database 134. The recommendation engine 162 can recommend the item(s) 106 based upon one or more of the items 106 currently marked for purchase, such as in the physical shopping cart 114. In some embodiments, the recommendation engine 162 can use external influences, such as from one or more social network platforms. In some embodiments, the social network platform is or includes one or more platforms as a service ("PaaS"). In some embodiments, the social network platform includes one or more application servers and/or other software and/or hardware to provide one or more social network services. The social networking services can include, but are not limited to, services for sharing or posting status updates, instant messages, links, photos, videos, and/or other information; services for commenting or displaying interest in articles, products, blogs, or other resources; and/or other services. In some embodiments, the social network platform provides, at least in part, the FACEBOOK social networking service, the LINKEDIN professional networking service, the MYSPACE social networking service, the FOURSQUARE geographic networking service, the YAMMER office colleague networking service, and the like. In other embodiments, the social networking platform provides other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/ or other services. It should be appreciated that the above lists of services are not exhaustive and that numerous additional and/or alternative social networking services are not mentioned herein for the sake of brevity. As such, the above embodiments are illustrative, and should not be construed as being limited in any way.

Figure 2A:
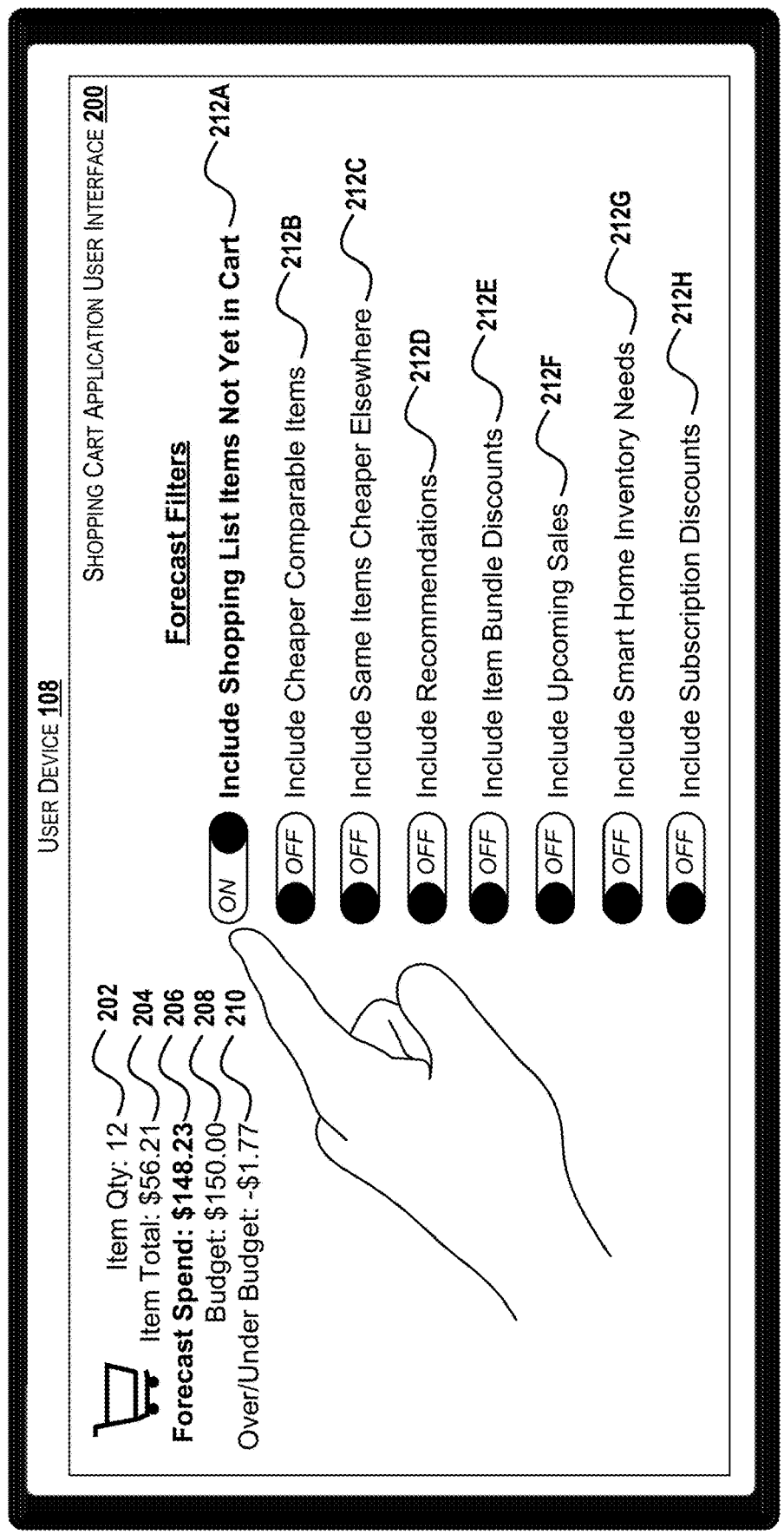
FIGS. 2A-2F are graphical user interface ("GUI") diagrams illustrating aspects of an exemplary shopping cart application user interface, according to an illustrative embodiment of the concepts and technologies disclosed herein.

Turning now to FIGS. 2A-2F, graphical user interface ("GUI") diagrams illustrating aspects of an exemplary shopping cart application UI 200 will be described, according to illustrative embodiments of the concepts and technologies disclosed herein. Turning first to FIG. 2A, the shopping cart application UI 200 is shown with a current shopping cart status, including the item quantity field 202, the item total field 204, the forecast spend field 206, the budget value field 208, and the over/under budget field 210 first introduced above, in addition to the forecast filters 212 to filter a value in the forecast spend field 206. In the illustrated example, the item quantity field 202 is populated with a quantity value of 12 to indicate that twelve of the items 106 are currently in the physical shopping cart 114 or otherwise marked for purchase; the item total field 204 is populated with an item total value of $56.21 to indicate the total cost of the items 106 currently in the physical shopping cart 114 or otherwise marked for purchase; the forecast spend field 206 is populated with a forecast spend value of $148.23 to indicate the total expenditure forecasted based upon one or more of the forecast filters 212, and in particular, a first forecast filter 212A is enabled to include shopping list items not yet in the physical shopping cart 114 or otherwise marked for purchase in the forecast spend field 206; the budget field 208 is populated with a budget value of $150 to indicate the budget available for the customer 110 (e.g., as provided by the budget module 154); and the over/under budget field 210 is populated with an over/under budget value of −$1.77 that is calculated based upon the budget value of $150.00 in the budget field 208 minus the forecast spend value of $148.23 in the forecast spend field 206.

Figure 2B:
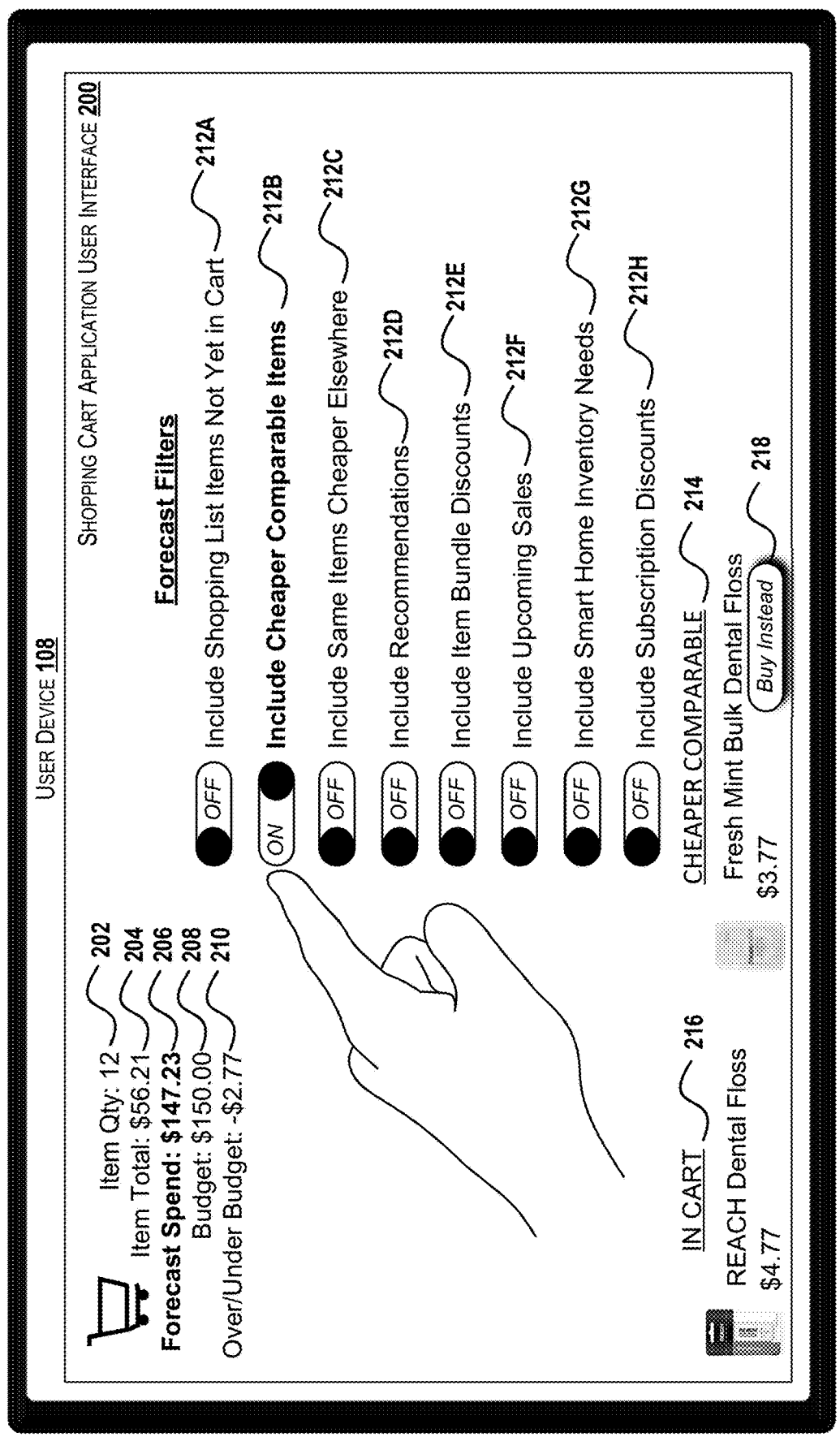

Turning now to FIG. 2B, the shopping cart application UI 200 is shown with a second forecast filter 212B enabled to include, in the forecast spend field 206, the cost of one or more comparable items 214 that is/are cheaper than one or more in cart items 216. In the illustrated example, a brand name of dental floss is shown at $4.77, and since the second forecast filter 212B is enabled, the forecast spend application 112 can consult the local store database 120 to recommend a store brand of dental floss for $3.77. For example, the cheaper comparable item 214 may be obtained based upon the local item data 126 and/or the local advertisement data 128. In the local store 102, the customer 110 may be directed to the aisle 104 in which the cheaper comparable item 214 can be found, or the cheaper comparable item 214 can be marked for purchase and picked up later such as during checkout, in response, for example, to the customer 110 selecting a Buy Instead option 218. The over/under budget field 210 is populated with an over/under budget value of −$2.77 that is calculated based upon the budget value of $150.00 in the budget field 208 minus the forecast spend value of $147.23 in the forecast spend field 206.

Figure 2C:
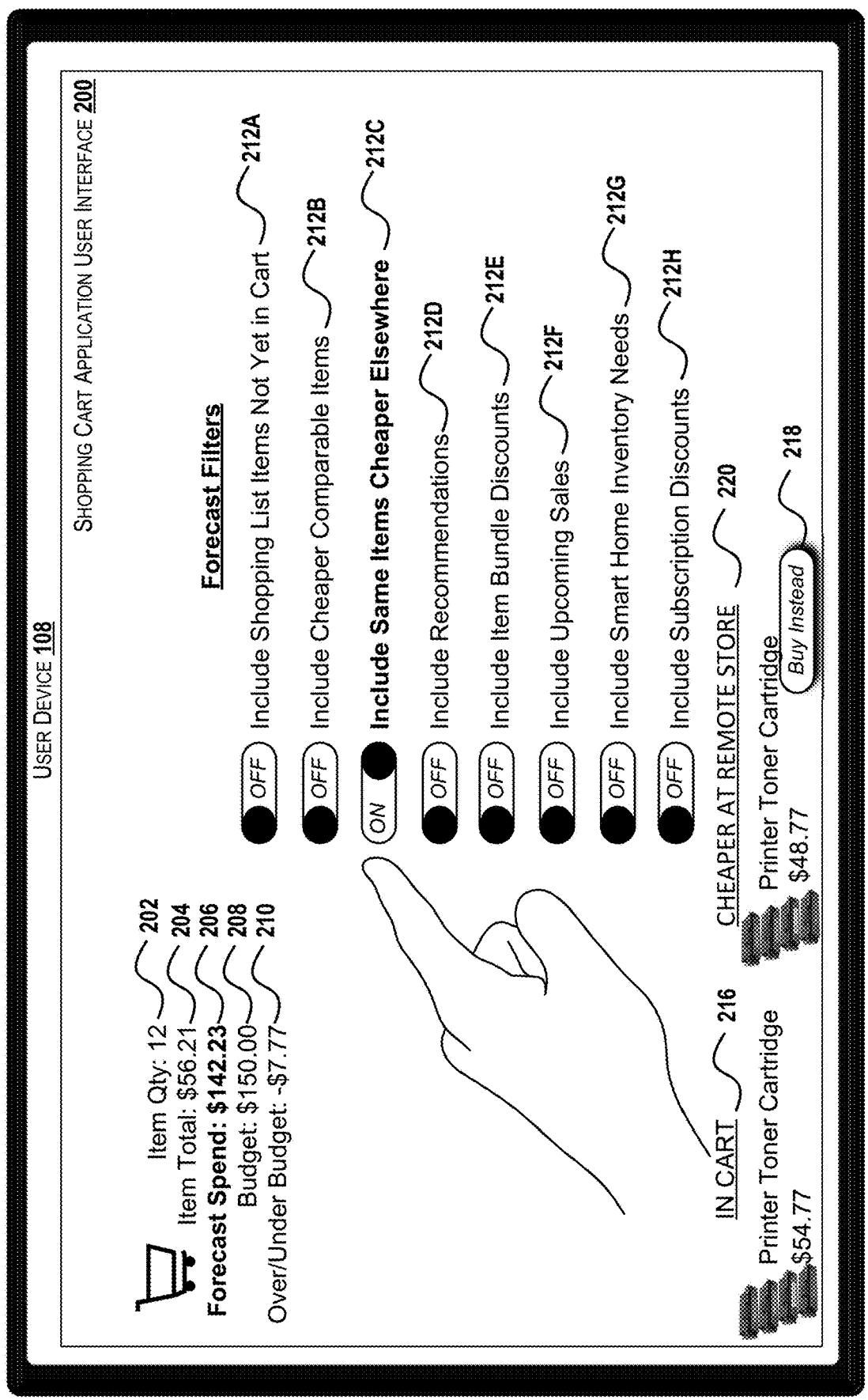

Turning now to FIG. 2C, the shopping cart application UI 200 is shown with a third forecast filter 212C enabled to include, in the forecast spend field 206, the cost of the same item(s) cheaper elsewhere, such as from one or more of the remote stores 132. In the illustrated example, a printer toner cartridge in the physical shopping cart 114 is shown at $54.77, and since the third forecast filter 212C is enabled, the forecast spend application 112 can consult the recommendation engine 162 and/or the remote store database 134 to recommend a same cheaper item 220 sold for $48.77 at one of the remote stores 132. For example, the same cheaper item 220 may be obtained based upon the remote item data 140 and/or the remote advertisement data 142. In this example, after selecting the Buy Instead option 218, the customer 110 may be directed a website, a web application, or a device application capable of being executed by the user device 108 to interact with the remote store 132 to purchase the same cheaper item 220, which can then be made available for the customer 110 to pick-up at the remote store 132 or shipped to the customer 110 at his/her home, office, post office box, or other location. The over/under budget field 210 is populated with an over/under budget value of −$7.77 that calculated based upon the budget value of $150.00 in the budget field 208 minus the forecast spend value of $142.23 in the forecast spend field 206.

Figure 2D:
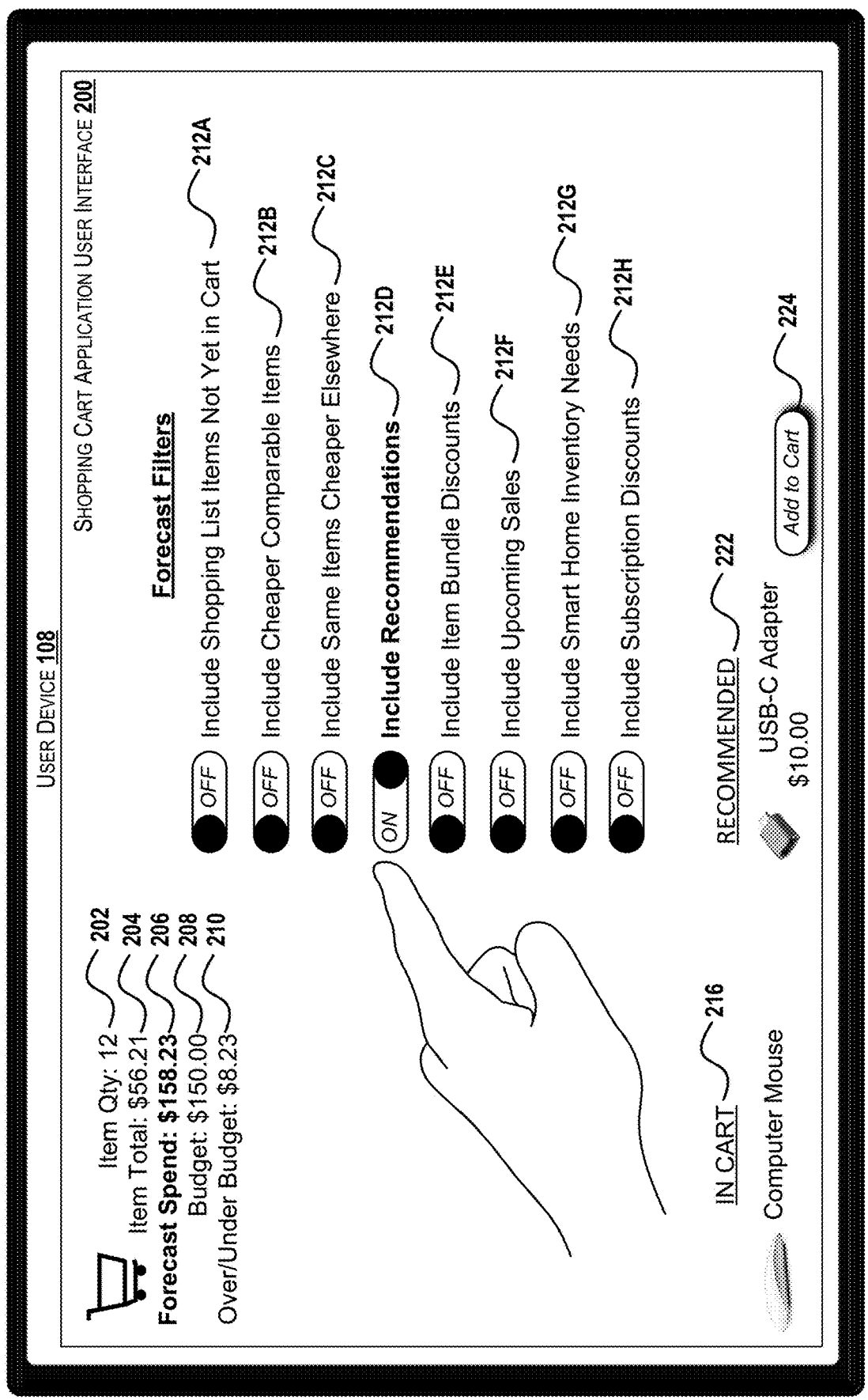

Turning now to FIG. 2D, the shopping cart application UI 200 is shown with a fourth forecast filter 212D enabled to include, in the forecast spend field 206, the cost of one or more items recommended by the recommendation engine 162 based upon one or more in cart items 216. In the illustrated example, a computer mouse is one of the in cart items 216, and the recommendation engine 162 can provide one or more recommended items 222 such as a USB-C adapter for a cost of $10.00. The customer 110 can add the recommended item(s) 222 to the physical shopping cart 114 or otherwise mark the recommended item(s) 222 for purchase by selecting an Add to Cart option 224. The over/under budget field 210 is populated with an over/under budget value of $8.23 that is calculated based upon the budget value of $150.00 in the budget field 208 minus the forecast spend value of $158.23 in the forecast spend field 206.

Figure 2E:
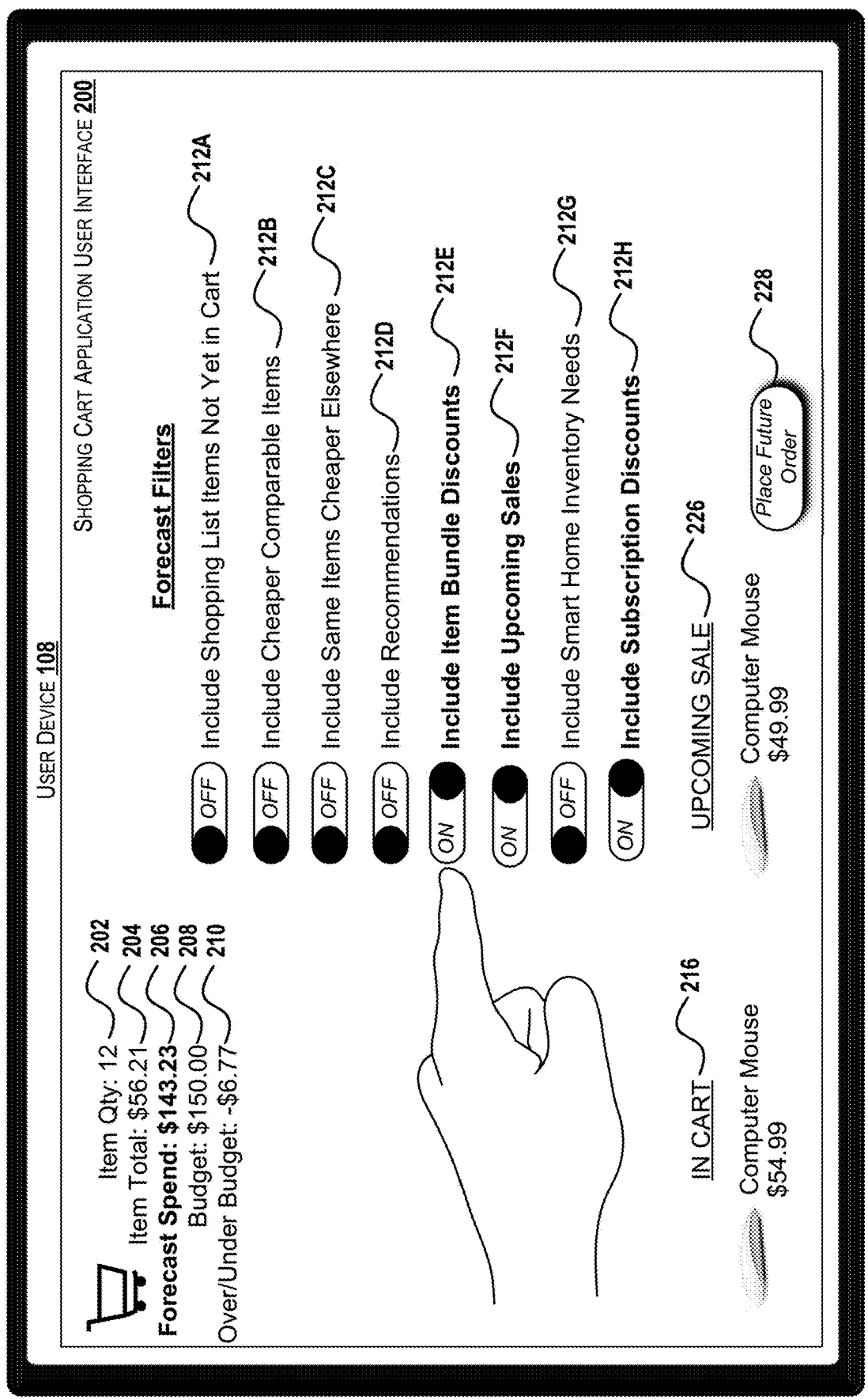

Turning now to FIG. 2E, the shopping cart application UI 200 is shown with a fifth forecast filter 212E, a sixth forecast filter 212F, and an eighth forecast filter 212H enabled to show any item bundle discounts available, upcoming sales at the local store 102 and/or the remote store(s) 132, and any subscription discounts available. In the illustrated example, a computer mouse is one of the in cart items 216, and based upon the local advertisement data 128 and/or the remote advertisement data 142, an upcoming sale item 226 can be shown and the customer 110 can be provided a Place Future Order option 228 to order the upcoming sale item 226 either from the local store 102 and/or the remote store(s) 132 depending upon the particular implementation.

Figure 2F:
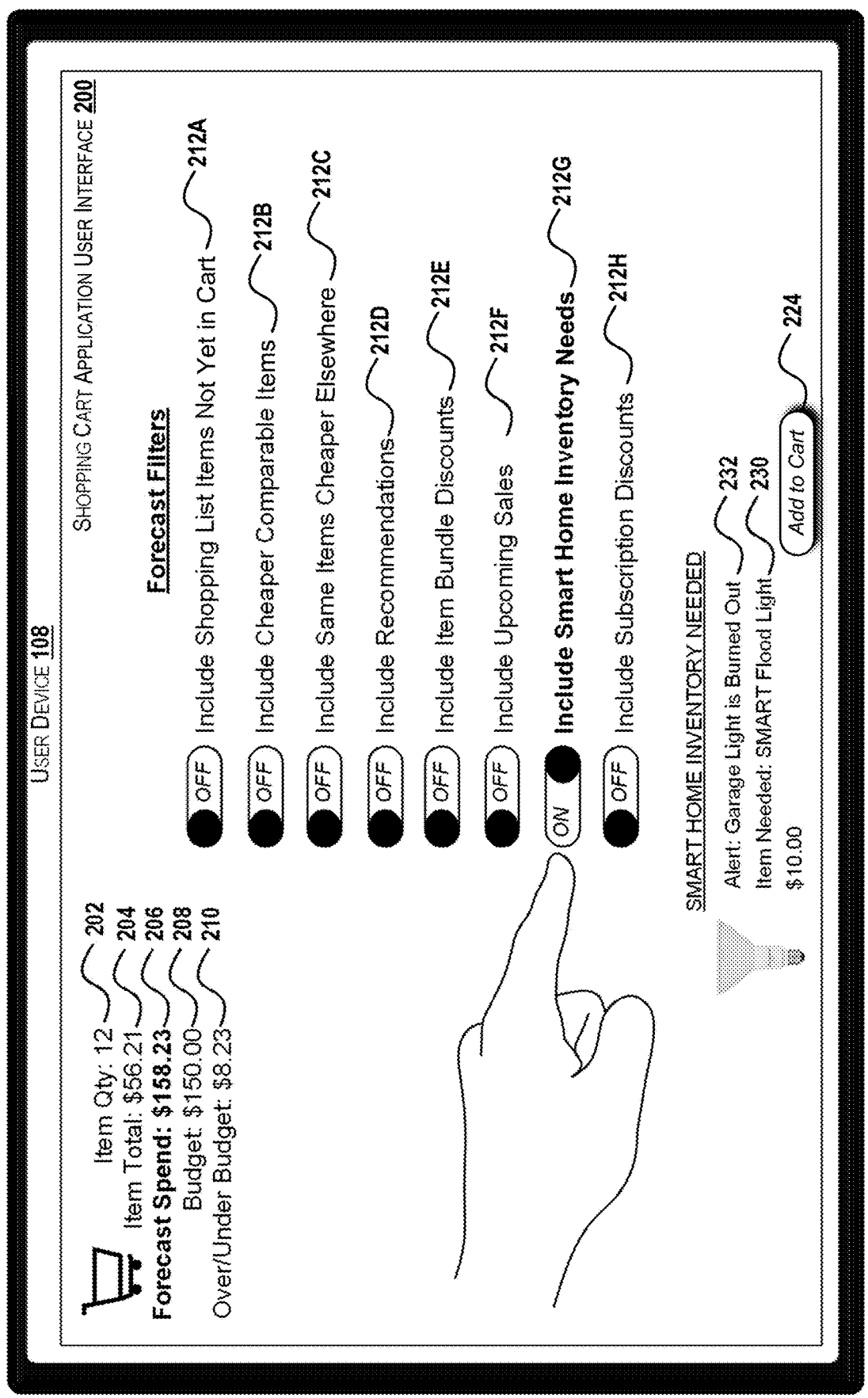

Turning now to FIG. 2F, the shopping cart application UI 200 is shown with a seventh forecast filter 212G enabled to show any smart home inventory needs. In the illustrated example, a smart home alert 232 from one or more of the smart home devices 146 is shown to indicate that a Garage Light is Burned Out and to provide an item needed 230 to address the smart home alert 232—in particular, a SMART flood light, which can be added to the cart via the Add to Cart option 224.

Figure 3:
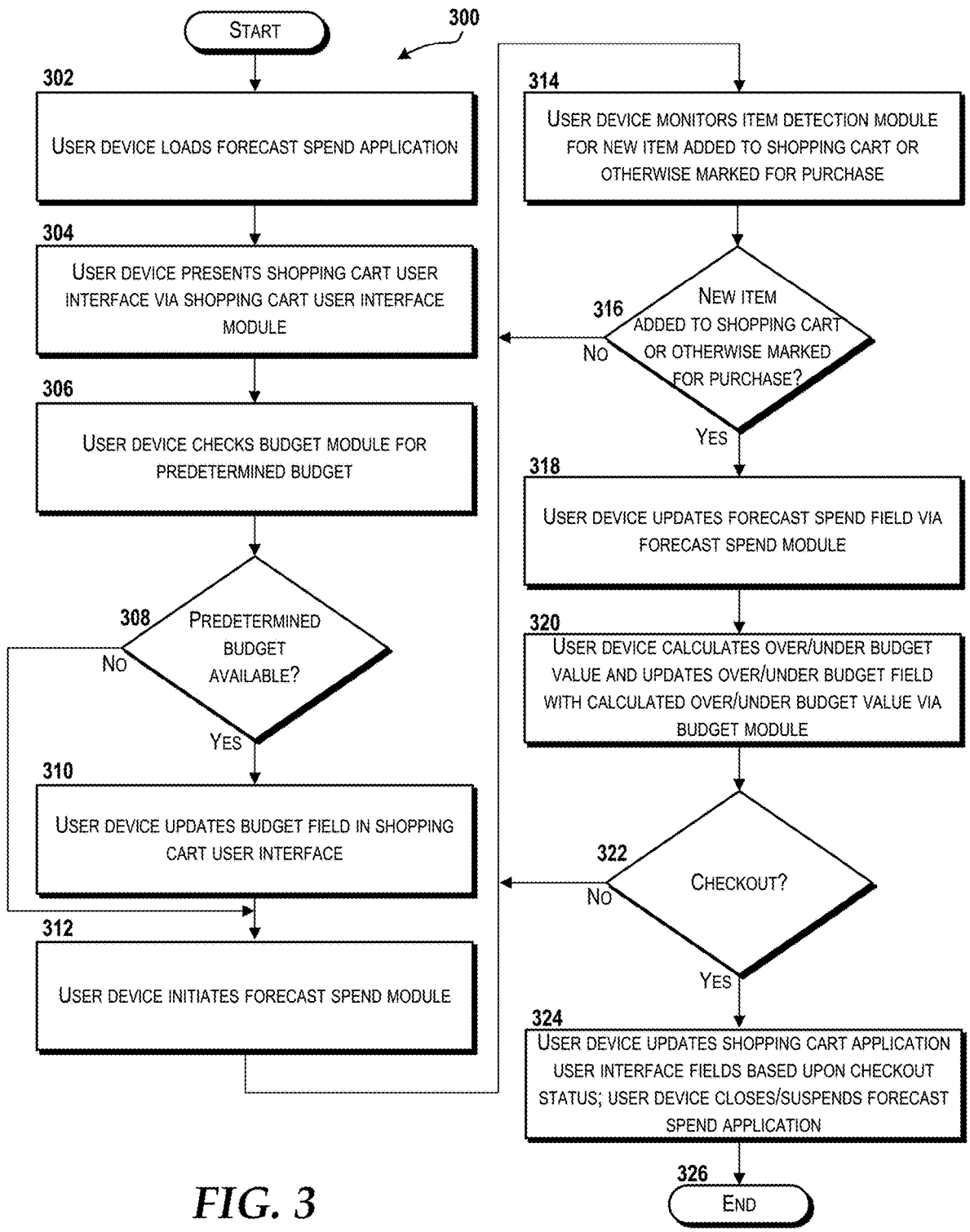
FIG. 3 is a flow diagram illustrating aspects of a method for forecasting expenditures to improve a customer shopping experience in a store environment, according to an illustrative embodiment.

Turning now to FIG. 3, a method 300 for forecasting expenditures to improve a customer shopping experience for the customer 110 in a store environment such as in the local store 102 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, for example, the user device 108, the smart home device 146, or the recommendation engine 162 to perform one or more operations and/or causing the processor to direct other components of the computing system or device to perform one or more of the operations.

For purposes of illustrating and describing the concepts of the present disclosure, operations of the methods disclosed herein are described as being performed by the user device 108 via execution of one or more software modules such as, for example, the shopping cart UI module 150, the forecast spend module 152, the budget module 154, the item detection module 156, the shopping list module 158, and the AR module 160 of the forecast spend application 112, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 begins and proceeds to operation 302, where the user device 108 loads the forecast spend application 112. From operation 302, the method 300 proceeds to operation 304, where the user device 108 presents the shopping cart UI 200 (shown in FIGS. 2A-2F) via the shopping cart UI module 150.

From operation 304, the method 300 proceeds to operation 306, where the user device 108 checks the budget module 154 for a predetermined budget previously created by or on behalf of the customer 110. From operation 306, the method 300 proceeds to operations 308, where the user device 108 determines if a predetermined budget is available from the budget module 154. If a predetermined budget is available, the method 300 proceeds to operation 310, where the user device 108 updates the budget field 208 in the shopping cart application UI 200. From operation 310, or if a predetermined budget is not available as determined at operation 308, the method 300 proceeds to operation 312, where the user device 108 initiates the forecast spend module 152.

From operation 312, the method 300 proceeds to operation 314, where the user device 108 monitors the item detection module 156 for a new item added to the physical shopping cart 114 or otherwise marked for purchase. From operation 314, the method 300 proceeds to operation 316, where the user device 108, via the item detection module 156, determines if a new item was added to the physical shopping cart 114 or otherwise marked for purchase. If not, the method 300 returns to operation 314, where the user device 108 continues to monitor the item detection module 156 for a new item added to the physical shopping cart 114 or otherwise marked for purchase. If a new item was added to the physical shopping cart 114 or otherwise marked for purchase, the method 300 proceeds to operation 318, where the user device 108 updates the forecast spend field 206 via the forecast spend module 152 to reflect the cost of the new item added to the physical shopping cart 114 or otherwise marked for purchase.

From operation 318, the method 300 proceeds to operation 320, where the user device 108 calculates an over/under budget value for the over/under budget field 210 by taking the budget value in the budget field 208 minus the forecast spend value in the forecast spend field 206 and updates the over/under budget field 210 accordingly.

From operation 320, the method 300 proceeds to operation 322, where it is determined if the customer 110 has checked out to purchase the item(s) 106 in the physical shopping cart 114 or otherwise marked for purchase. If not, the method 300 can return to operation 314 and proceed as described above. If the customer 110 has checked out, the method 300 proceeds to operation 324, where the user device 108 updates the shopping cart application UI fields—that is, the quantity field 202, the item total field 204, the forecast spend field 206, the budget field 208, and the over/under budget field 210—based upon the check status. Also at operation 324, the user device 108 can close or suspend the forecast spend application 112. From operation 324, the method 300 proceeds to operation 326, where the method 300 ends.

Figure 4:
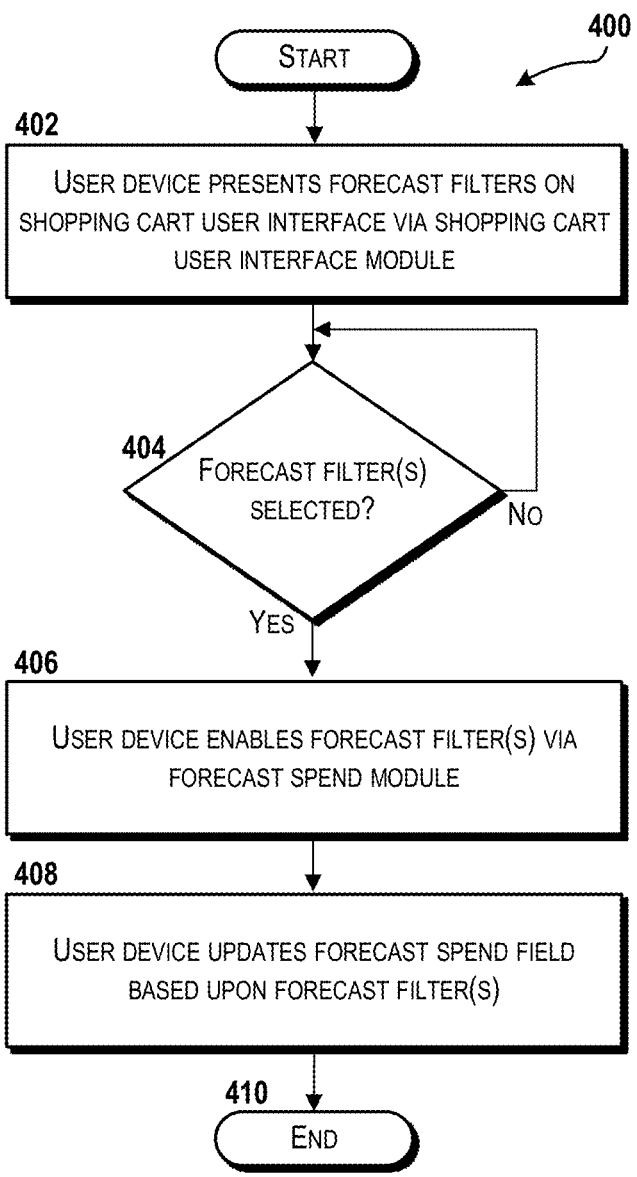
FIG. 4 is a flow diagram illustrating aspects of a method for implementing an expenditure forecast filter, according to an illustrative embodiment.

Turning now to FIG. 4, a method 400 for implementing an expenditure forecast filter, such as one of the forecast filters 212A-212I1 described above with reference to FIGS. 2A-2F, will be described, according to an illustrated embodiment. The method 400 begins and proceeds to operation 402, where the user device 108 presents the forecast filters 212 on the shopping cart user interface 200 (e.g., as shown in FIGS. 2A-2F). From operation 402, the method 400 proceeds to operation 404, where it is determined if one or more of the forecast filters 212 has been selected via the shopping cart user interface. When one or more of the forecast filters 212 has been selected, the method 400 proceeds to operation 406, where the user device 108 enables the forecast filter(s) 112 via the forecast spend module 152. From operation 406, the method 400 proceeds to operation 408, where the user device 108 updates the forecast spend field 206 based upon the forecast filter(s) 112. From operation 408, the method 400 proceeds to operation 410, where the method 400 ends.

Figure 5:
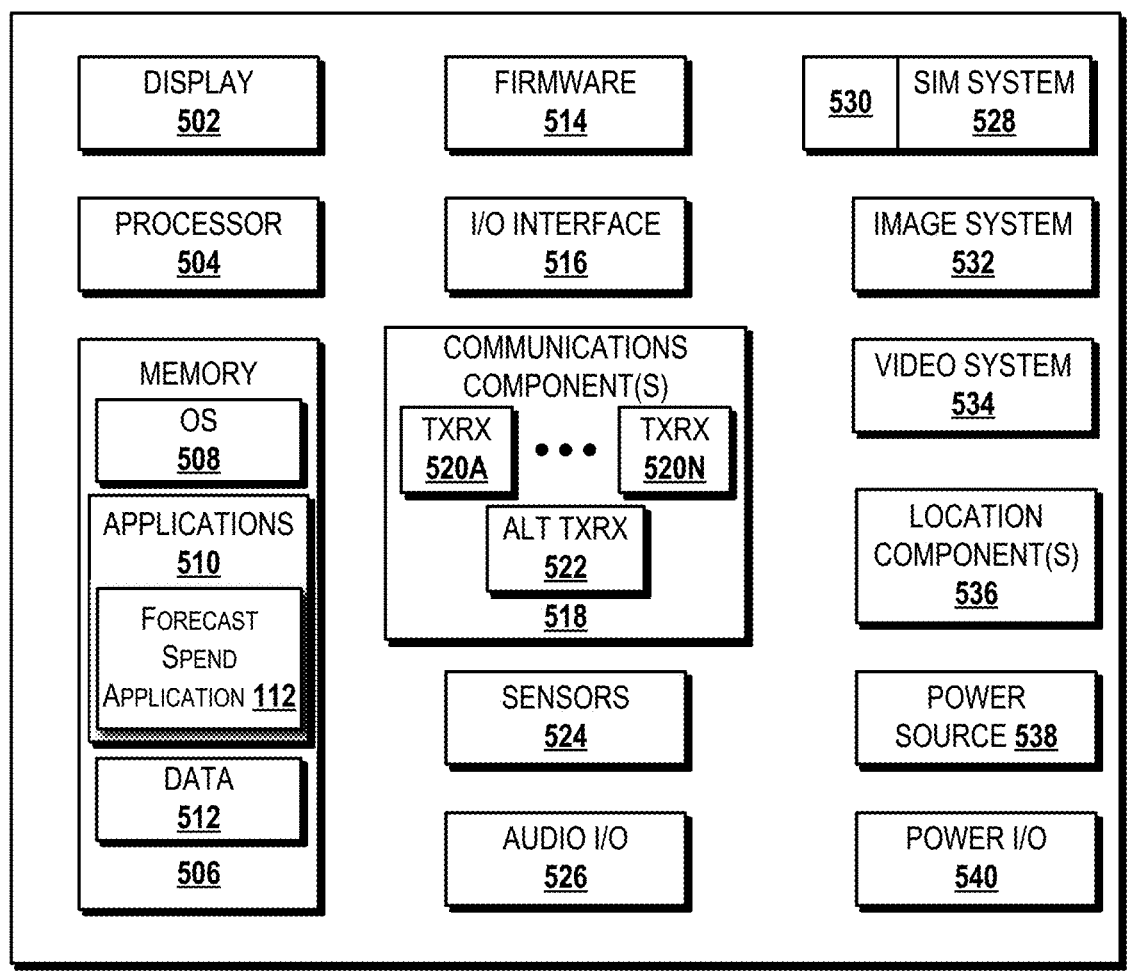
FIG. 5 is a block diagram illustrating an example mobile device, according to some illustrative embodiments.

Turning now to FIG. 5, an illustrative mobile device 500 and components thereof will be described. In some embodiments, the user device 108 described above can be configured as and/or can have an architecture similar or identical to the mobile device 500 described herein with respect to FIG. 5. It should be understood, however, that the user device 108 may or may not include the functionality described herein with reference to FIG. 5. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. The display 502 is illustrated as part of the mobile device 500 but alternately may be connected to the mobile device 500. For example, AR glasses may be provided as the display 500 or as an alternative or addition to the display 500. According to various embodiments, the display 502 can be configured to display at least a portion of the local customer data 122, at least a portion of the local store data 124, at least a portion of the local item data 126, at least a portion of the local advertisement data 128, at least a portion of the remote customer data 136, at least a portion of the remote store data 138, at least a portion of the remote item data 140, at least a portion of the remote advertisement data 142, the shopping cart UI 200 (including one or more of the cart application UI fields 202, 204, 206, 208, 210), the forecast filter 212, other visual elements described and/or illustrated herein (e.g., in FIGS. 2A-2F), the AR objects 164, various graphical user interface ("GUI") elements, text, images, video, virtual keypads and/or keyboards, messaging data, notification messages, metadata, internet content, device status, time, date, calendar data, device preferences, map and location data, customer service interactions, combinations thereof, and the like.

The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510 such as the forecast spend application 112, other computer-executable instructions stored in a memory 506, or the like. In some embodiments, the applications 510 also can include a UI application (not illustrated in FIG. 5).

The UI application can interface with the operating system 508 to facilitate user interaction with functionality and/or data stored at the mobile device 500 and/or stored elsewhere, such as in the local store database 120 and/or the remote store database 134. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in interacting with the forecast spend application 112, the shopping cart UI module 150, the forecast spend module 152, the budget module 154, the item detection module 156, the shopping list module 158, the AR module 160, other applications, other software modules, other devices, and/or systems not specifically described herein. The UI application can be executed by the processor 504 to aid a user in answering/initiating calls, entering/deleting other data, entering and setting user IDs and passwords for device access, configuring settings, manipulating address book content and/or settings, multimode interaction, interacting with other applications 510, and otherwise facilitating user interaction with the operating system 508, the applications 510, and/or other types or instances of data 512 that can be stored at the mobile device 500.

According to various embodiments, the applications 510 can include, for example, the forecast spend application 112, the shopping cart UI module 150, the forecast spend module 152, the budget module 154, the item detection module 156, the shopping list module 158, the AR module 160, a web browser application, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 510, the data 512, and/or portions thereof can be stored in the memory 506 and/or in a firmware 514, and can be executed by the processor 504. The firmware 514 also can store code for execution during device power up and power down operations. It should be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data. In some embodiments, the I/O interface 516 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks, such as the network 116, the local store network 118, the remote store network 130, and/or the smart home network 144. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using GSM, CDMAONE, CDMA2000, LTE, and various other 2G, 2.5G, 3G, 4G, and greater generation technology standards. Moreover, the communications component 518 may facilitate communications over various channel access methods (which may or may not be used by the aforementioned standards) including, but not limited to, TDMA, FDMA, W-CDMA, OFDM, SDMA, and the like.

In addition, the communications component 518 may facilitate data communications using GPRS, EDGE, the HSPA protocol family including HSDPA, EUL or otherwise termed HSDPA, HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-N (hereinafter collectively and/or generically referred to as "transceivers 520") are shown in FIG. 5, it should be appreciated that less than two, two, or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, BLE, infrared, infrared data association ("IRDA"), near field communications ("NFC"), other RF technologies, combinations thereof, and the like. As such, the alternative transceiver 522 can facilitate communications with the physical shopping cart 114 or one or more sensors thereof, the smart home device(s) 146, and other device and systems described herein.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. One or more of the sensors 524 can be used to detect movement of the mobile device 500. One or more of the sensors 524 can be used by the item detection module 156 to detect one or more of the items(s) 106 when the item(s) 106 is/are added to the physical shopping cart 114. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. In some embodiments, the image system 532 can be used to capture information about the items 106, including a UPC or other identifier to be used as a trigger for the item detection module 156. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a location of the mobile device 500. According to various embodiments, the location components 536 can send and/or receive signals from GPS devices, assisted-GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

Figure 6:
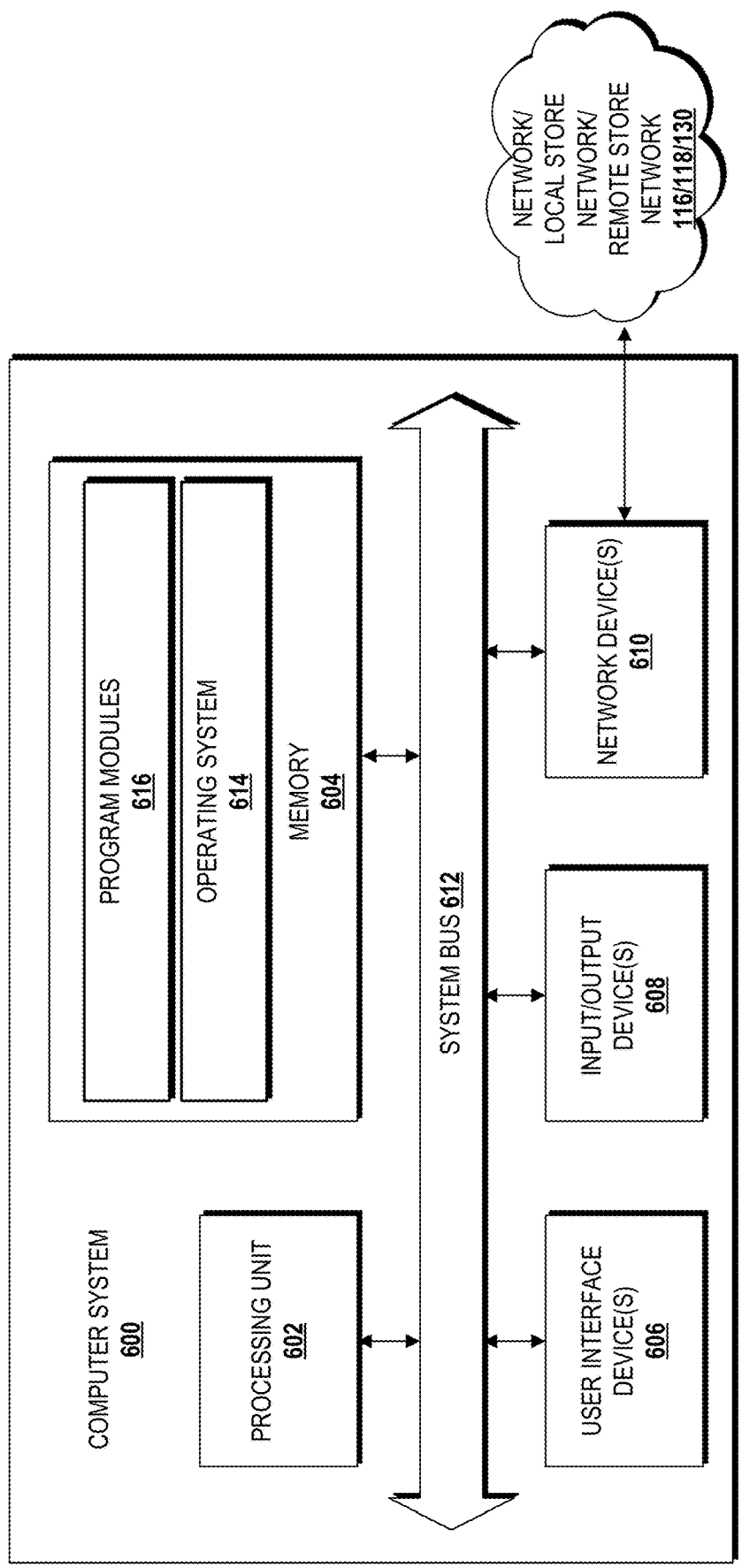
FIG. 6 is a block diagram illustrating an example computer system, according to some illustrative embodiments.

Turning now to FIG. 6, a block diagram illustrating a computer system 600 configured to provide the functionality described herein in accordance with various embodiments of the concepts and technologies disclosed herein. In some embodiments, the user device 108, the smart home devices 146, the forecast spend server 148, the recommendation engine 162, and/or one or more other systems associated with the local store network 118, the local store database 120, the remote store network 130, the remote store database 134, can be configured as and/or can have an architecture similar or identical to the computer system 600 described herein with respect to FIG. 6. It should be understood however, that the user device 108, the smart home devices 146, the forecast spend server 148, the recommendation engine 162, and/or one or more other systems associated with the local store network 118, the local store database 120, the remote store network 130, the remote store database 134 may or may not include the functionality described herein with reference to FIG. 6.

The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the computer system 600. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 616 may include various software and/or program modules described herein, such as the forecast spend application 112, the shopping cart UI module 150, the forecast spend module 152, the budget module 154, the item detection module 156, the shopping list module 158, and the AR module 160, which can be embodied in computer-readable media containing instructions that, when executed by the processing unit 602, perform at least a portion of one or more of the methods 300, 400 described in detail above with respect to FIGS. 3-4. According to embodiments, the program modules 616 may be embodied in hardware, software, firmware, or any combination thereof. Although not shown in FIG. 6, it should be understood that the memory 604 also can be configured to store all or a portion of the data that can be stored in the local store database 120, the remote store database 134, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer to output data in the form of text, numbers, characters, maps, other visualizations, and the like.

The network devices 610 enable the computer system 600 to communicate with other networks or remote systems via one or more networks such as the network 116, the local store network 118, the remote store network 130, and/or the smart home network 144. Examples of the network devices 610 include, but are not limited to, a modem, a radio frequency ("RF") or infrared ("IR") transceiver, a telephonic interface, a bridge, a router, or a network card. The network(s) may include a wireless network such as, but not limited to, a WLAN such as a WI-FI network, a WWAN, a Wireless Personal Area Network ("WPAN") such as BLUETOOTH, a WMAN such a WiMAX network, or a cellular network. Alternatively, the network(s) may be a wired network such as, but not limited to, a WAN such as the Internet, a LAN, a wired PAN, or a wired MAN.

Figure 7:
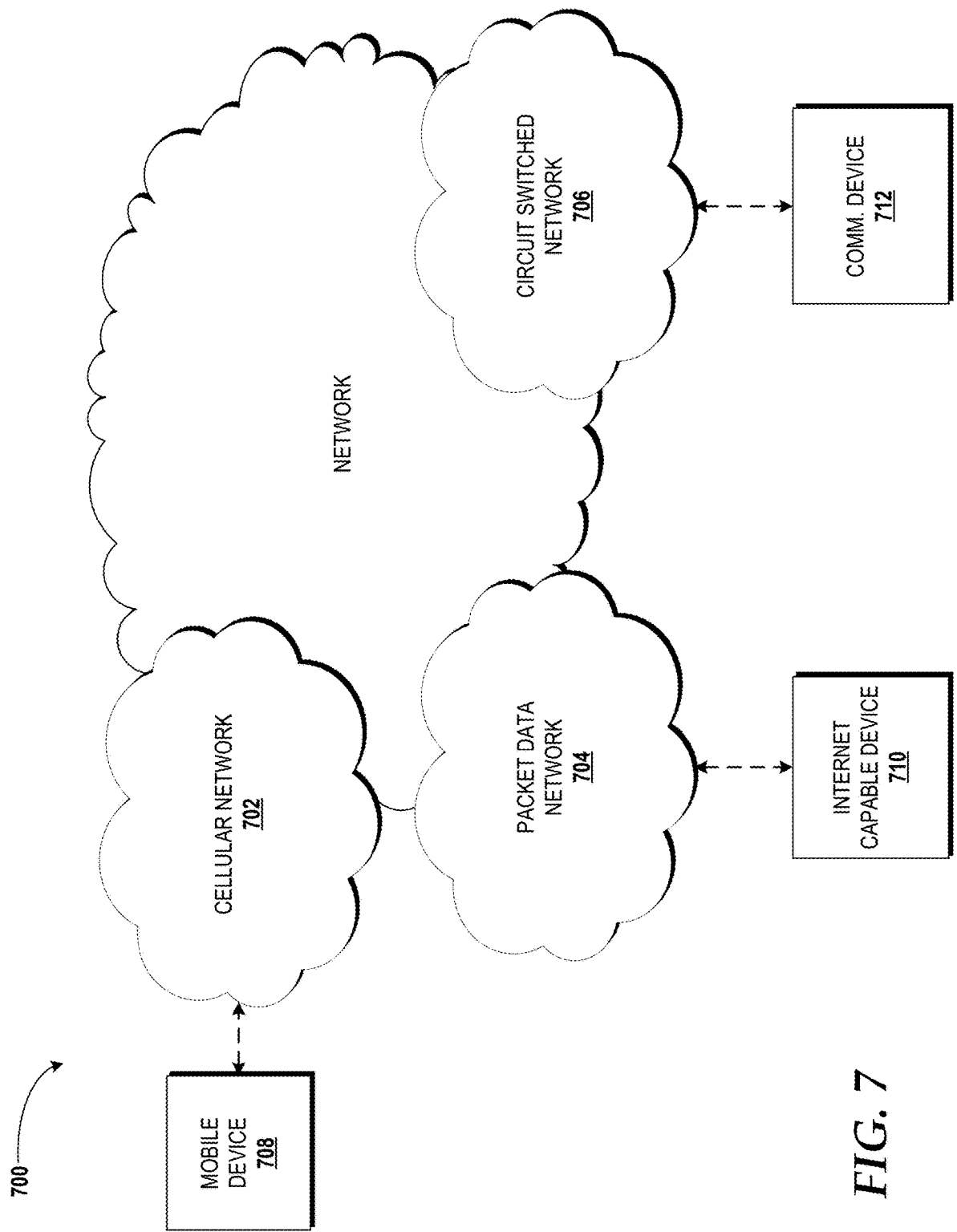
FIG. 7 schematically illustrates a network, according to an illustrative embodiment.

Turning now to FIG. 7, additional details of an embodiment of an exemplary network 700, such as representative of the network 116, is illustrated, according to an illustrative embodiment. The illustrated network 700 includes a cellular network 702, a packet data network 704, for example, the Internet, and a circuit switched network 706, for example, a publicly switched telephone network ("PSTN"). The cellular network 702 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, the user device 108, a cellular telephone, a user equipment, a mobile terminal, a PDA, a laptop computer, a handheld computer, and combinations thereof, can be operatively connected to the cellular network 702. The cellular network 702 can be configured as a 2G GSM network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSDPA), and HSPA+. The cellular network 702 also is compatible with 4G mobile communications standards as well as evolved and future mobile standards.

The packet data network 704 includes various devices, for example, servers, computers, databases, and other devices in communication with one another, as is generally known. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a plain old telephone system ("POTS"). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 77, for example, a personal computer ("PC"), a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. In the specification, the network 116 may be used to refer broadly to any combination of the networks 702, 704, 706. It should be appreciated that substantially all of the functionality described with reference to the network 116 can be performed by the cellular network 702, the packet data network 704, and/or the circuit switched network 706, alone or in combination with other networks, network elements, and the like.

Figure 8:
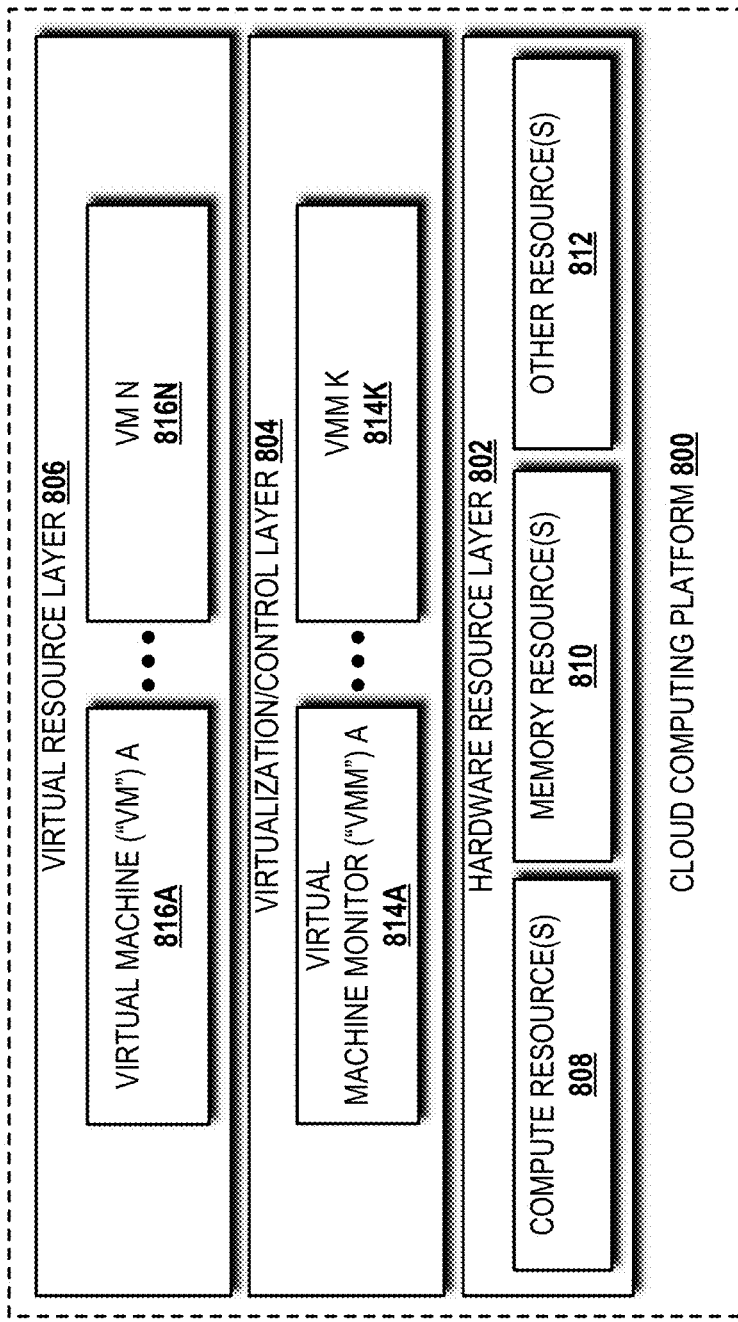
FIG. 8 is a block diagram illustrating a cloud computing platform capable of implementing aspects of the concepts and technologies disclosed herein.

Turning now to FIG. 8, a cloud computing platform 800 capable of implementing aspects of the concepts and technologies disclosed herein will be described, according to an illustrative embodiment. In some embodiments, the user device 108, the forecast spend server 148, the smart home devices 146, the recommendation engine 162, the local store database 120, the remote store database 134, and/or other systems, devices, or databases can be implemented, at least in part, on the cloud computing platform 800. Those skilled in the art will appreciate that the illustrated cloud computing platform 800 is a simplification of but one possible implementation of an illustrative cloud computing environment, and as such, the cloud computing platform 800 should not be construed as limiting in any way.

The illustrated cloud computing platform 800 includes a hardware resource layer 802, a virtualization/control layer 804, and a virtual resource layer 806 that work together to perform operations as will be described in detail herein. While connections are shown between some of the components illustrated in FIG. 8, it should be understood that some, none, or all of the components illustrated in FIG. 8 can be configured to interact with one other to carry out various functions described herein. In some embodiments, the components are arranged so as to communicate via one or more networks (not shown). Thus, it should be understood that FIG. 8 and the following description are intended to provide a general understanding of a suitable environment in which various aspects of embodiments can be implemented, and should not be construed as being limiting in any way.

The hardware resource layer 802 provides hardware resources, which, in the illustrated embodiment, include one or more compute resources 808, one or more memory resources 810, and one or more other resources 812. The compute resource(s) 808 can include one or more hardware components that perform computations to process data, and/or to execute computer-executable instructions of one or more application programs, operating systems, and/or other software. The compute resources 808 can include one or more central processing units ("CPUs") configured with one or more processing cores. The compute resources 808 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 808 can include one or more discrete GPUs. In some other embodiments, the compute resources 808 can include CPU and GPU components that are configured in accordance with a co-processing CPU/GPU computing model, wherein the sequential part of an application executes on the CPU and the computationally-intensive part is accelerated by the GPU. The compute resources 808 can include one or more system-on-chip ("SoC") components along with one or more other components, including, for example, one or more of the memory resources 810, and/or one or more of the other resources 812. In some embodiments, the compute resources 808 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 808 can be or can include one or more hardware components architected in accordance with an ARM architecture, available for license from ARM HOLDINGS of Cambridge, United Kingdom. Alternatively, the compute resources 808 can be or can include one or more hardware components architected in accordance with an x86 architecture, such an architecture available from INTEL CORPORATION of Mountain View, Calif., and others. Those skilled in the art will appreciate the implementation of the compute resources 808 can utilize various computation architectures, and as such, the compute resources 808 should not be construed as being limited to any particular computation architecture or combination of computation architectures, including those explicitly disclosed herein.

The memory resource(s) 810 can include one or more hardware components that perform storage operations, including temporary or permanent storage operations. In some embodiments, the memory resource(s) 810 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 808.

The other resource(s) 812 can include any other hardware resources that can be utilized by the compute resources(s) 808 and/or the memory resource(s) 810 to perform operations described herein, such as with respect to the methods 300, 400. The other resource(s) 812 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 802 can be virtualized by one or more virtual machine monitors ("VMMs") 814A-814K (also known as "hypervisors;" hereinafter "VMMs 814") operating within the virtualization/control layer 804 to manage one or more virtual resources that reside in the virtual resource layer 806. The VMMs 814 can be or can include software, firmware, and/or hardware that alone or in combination with other software, firmware, and/or hardware, manages one or more virtual resources operating within the virtual resource layer 806.

The virtual resources operating within the virtual resource layer 806 can include abstractions of at least a portion of the compute resources 808, the memory resources 810, the other resources 812, or any combination thereof. These abstractions are referred to herein as virtual machines ("VMs"). In the illustrated embodiment, the virtual resource layer 806 includes VMs 816A-816N (hereinafter "VMs 816").

Based on the foregoing, it should be appreciated that a method, device, and computer-readable storage medium for forecasting expenditures to improve customer shopping experience in a store environment have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
capturing, by a user device comprising a processor executing a forecast spend application, an image of an environment of the user device;
presenting, by the user device, an augmented reality display comprising a shopping cart user interface overlaid on the image, wherein the shopping cart user interface comprises a forecast spend field and a plurality of forecast filters, wherein each of the plurality of forecast filters is associated with an option selectable via input to the user device to enable or disable a corresponding forecast filter of the plurality of forecast filters, and wherein enabling a corresponding forecast filter updates the forecast spend field based on the corresponding forecast filter;
initiating, by the user device, a forecast spend module of the forecast spend application;
monitoring, by the user device, an item detection module of the forecast spend application for a new item added to a physical shopping cart associated with the shopping cart user interface or otherwise marked for purchase;
in response to the new item being added to the physical shopping cart or otherwise marked for purchase, updating, by the user device via the forecast spend module, the forecast spend field in the shopping cart user interface with a forecast spend value based upon a cost of the new item;
receiving, by the user device via a network, an alert from an Internet of Things ("IoT") device that is remote from the user device;
determining, by the user device via the forecast spend module, whether a forecast filter of the plurality of forecast filters that is associated with an inventory of IoT devices is selected;
in response to determining that the forecast filter of the plurality of forecast filters that is associated with the inventory of IoT devices is selected,
  enabling, by the user device via the forecast spend module, the forecast filter associated with the inventory of IoT devices, and
  displaying, by the user device, the alert from the IoT device and an image of an item that is needed to address the alert via the shopping cart user interface;
in response to receiving selection of an option presented via the shopping cart user interface that is associated with the image of the item that is needed to address the alert, updating, by the user device via the forecast spend module, the forecast spend field in the shopping cart user interface with an updated forecast spend value based upon a cost of the item needed to address the alert;
checking, by the user device via a budget module, a predetermined budget;
in response to the budget module finding the predetermined budget, updating a budget field in the shopping cart user interface with a budget value based upon at least part of the predetermined budget;
calculating, by the user device via the budget module, an over/under budget value; and
updating an over/under budget field in the shopping cart user interface with the over/under budget value based upon the budget value minus the forecast spend value.

2. The method of claim 1, further comprising:
determining if a checkout has occurred; and
in response to determining that the checkout has occurred, updating the forecast spend field, the budget field, and the over/under budget field in the shopping cart user interface.

3. The method of claim 1, further comprising:
receiving, by the user device, a selection of a different forecast filter from the plurality of forecast filters via the shopping cart user interface;
in response to the selection, enabling, by the user device via the forecast spend module, the different forecast filter; and
updating, by the user device, the forecast spend field based upon the different forecast filter.

4. The method of claim 1, wherein the plurality of forecast filters cause the forecast spend value to be updated to include at least one of:
  a cost of a shopping list item not yet in the physical shopping cart or otherwise marked for purchase;
  a cost of a cheaper item that is comparable to the new item;
  a cost of a same item that is cheaper at a remote store;
  a cost of a recommended item;
  a cost of the new item with an item bundle discount;
  a cost of the new item based upon an upcoming sale; or
  a cost of the new item with a subscription discount.

5. A device comprising:
a processor; and
a memory that stores computer-executable instructions of a forecast spend application that, when executed by the processor, cause the processor to perform operations comprising
  capturing an image of an environment of the device,
  presenting an augmented reality display comprising a shopping cart user interface overlaid on the image, wherein the shopping cart user interface comprises a forecast spend field and a plurality of forecast filters, wherein each of the plurality of forecast filters is associated with an option selectable via input to the device to enable or disable a corresponding forecast filter of the plurality of forecast filters, and wherein enabling a corresponding forecast filter updates the forecast spend field based on the corresponding forecast filter,
  initiating a forecast spend module of the forecast spend application,
  monitoring an item detection module of the forecast spend application for a new item added to a physical shopping cart associated with the shopping cart user interface or otherwise marked for purchase,
  in response to the new item being added to the physical shopping cart or otherwise marked for purchase, updating, via the forecast spend module, a forecast spend field in the shopping cart user interface with a forecast spend value based upon a cost of the new item,
  receiving, via a network, an alert from an Internet of Things ("IoT") device that is remote from the device,
  determining, via the forecast spend module, whether a forecast filter of the plurality of forecast filters that is associated with an inventory of IoT devices is selected,
  in response to determining that the forecast filter of the plurality of forecast filters that is associated with the inventory of IoT devices is selected,
    enabling, via the forecast spend module, the forecast filter associated with the inventory of IoT devices, and
    displaying the alert from the IoT device and an image of an item that is needed to address the alert via the shopping cart user interface,
  in response to receiving selection of an option presented via the shopping cart user interface that is associated with the image of the item that is needed to address the alert, updating, via the forecast spend module, the forecast spend field in the shopping cart user interface with an updated forecast spend value based upon a cost of the item needed to address the alert,
  checking, via a budget module of the forecast spend application, a predetermined budget, in response to the budget module finding the predetermined budget, updating a budget field in the shopping cart user interface with a budget value based upon at least part of the predetermined budget, calculating, via the budget module, an over/under budget value, and updating an over/under budget field in the shopping cart user interface with the over/under budget value based upon the budget value minus the forecast spend value.

6. The device of claim 5, wherein the operations further comprise:

determining if a checkout has occurred; and in response to determining that the checkout has occurred, updating the forecast spend field, the budget field, and the over/under budget field in the shopping cart user interface.

7. The device of claim 5, wherein the operations further comprise:

receiving a selection of a different forecast filter from the plurality of forecast filters via the shopping cart user interface;

in response to the selection, enabling, via the forecast spend module, the different forecast filter; and updating the forecast spend field based upon the different forecast filter.

8. The device of claim 5, wherein the plurality of forecast filters cause the forecast spend value to be updated to include at least one of:

a cost of a shopping list item not yet in the physical shopping cart or otherwise marked for purchase;

a cost of a cheaper item that is comparable to the new item;

a cost of a same item that is cheaper at a remote store;

a cost of a recommended item;

a cost of the new item with an item bundle discount;

a cost of the new item based upon an upcoming sale; or a cost of the new item with a subscription discount.

9. A computer-readable storage medium having computer-executable instructions of a forecast spend application that, when executed by a processor of a user device, cause the user device to perform operations comprising:

capturing an image of an environment of the user device;

presenting an augmented reality display comprising a shopping cart user interface overlaid on the image, wherein the shopping cart user interface comprises a forecast spend field and a plurality of forecast filters, wherein each of the plurality of forecast filters is associated with an option selectable via input to the user device to enable or disable a corresponding forecast filter of the plurality of forecast filters, and wherein enabling a corresponding forecast filter updates the forecast spend field based on the corresponding forecast filter;

initiating a forecast spend module of the forecast spend application;

monitoring an item detection module of the forecast spend application for a new item added to a physical shopping cart associated with the shopping cart user interface or otherwise marked for purchase;

in response to the new item being added to the physical shopping cart or otherwise marked for purchase, updating, via the forecast spend module, the forecast spend field in the shopping cart user interface with a forecast spend value based upon a cost of the new item;

receiving, via a network, an alert from an Internet of Things ("IoT") device that is remote from the user device;

determining, via the forecast spend module, whether a forecast filter of the plurality of forecast filters that is associated with an inventory of IoT devices is selected;

in response to determining that the forecast filter of the plurality of forecast filters that is associated with the inventory of IoT devices is selected;

enabling, via the forecast spend module, the forecast filter associated with the inventory of IoT devices, and displaying the alert from the IoT device and an image of an item that is needed to address the alert via the shopping cart user interface;

in response to receiving selection of an option presented via the shopping cart user interface that is associated with the image of the item that is needed to address the alert, updating, via the forecast spend module, the forecast spend field in the shopping cart user interface with an updated forecast spend value based upon a cost of the item needed to address the alert;

checking, via a budget module of the forecast spend application, a predetermined budget;

in response to the budget module finding the predetermined budget, updating a budget field in the shopping cart user interface with a budget value based upon at least part of the predetermined budget;

calculating, via the budget module, an over/under budget value; and updating an over/under budget field in the shopping cart user interface with the over/under budget value based upon the budget value minus the forecast spend value.

10. The computer-readable storage medium of claim 9, wherein the operations further comprise:

determining if a checkout has occurred; and in response to determining that the checkout has occurred, updating the forecast spend field, the budget field, and the over/under budget field in the shopping cart user interface.

11. The computer-readable storage medium of claim 9, wherein the operations further comprise:

receiving a selection of a different forecast filter from the plurality of forecast filters via the shopping cart user interface;

in response to the selection, enabling, via the forecast spend module, the different forecast filter; and updating the forecast spend field based upon the different forecast filter.

12. The computer-readable storage medium of claim 9, wherein the plurality of forecast filters cause the forecast spend value to be updated to include at least one of:

a cost of a shopping list item not yet in the physical shopping cart or otherwise marked for purchase;

a cost of a cheaper item that is comparable to the new item;

a cost of a same item that is cheaper at a remote store;

a cost of a recommended item;

a cost of the new item with an item bundle discount;

a cost of the new item based upon an upcoming sale; or a cost of the new item with a subscription discount.

* * * * *